(12) United States Patent
Garcia et al.

(10) Patent No.: US 11,586,668 B2
(45) Date of Patent: Feb. 21, 2023

(54) METHOD FOR THE PHYSICAL, IN PARTICULAR OPTICAL, DETECTION OF AT LEAST ONE USAGE OBJECT

(71) Applicants: Markus Garcia, Schindellegi (CH); Thomas Zellweger, Oppligen (CH)

(72) Inventors: Markus Garcia, Schindellegi (CH); Thomas Zellweger, Oppligen (CH)

( * ) Notice: Subject to any disclaimer, the term of this patent is extended or adjusted under 35 U.S.C. 154(b) by 8 days.

(21) Appl. No.: 17/359,287

(22) Filed: Jun. 25, 2021

(65) Prior Publication Data
US 2021/0319060 A1    Oct. 14, 2021

Related U.S. Application Data

(62) Division of application No. 16/557,503, filed on Aug. 30, 2019, now Pat. No. 11,080,327.

(30) Foreign Application Priority Data

Apr. 18, 2019   (DE) .................. 10 2019 110 344.4
Apr. 18, 2019   (DE) .................. 10 2019 110 345.2

(51) Int. Cl.
*G06F 16/51*   (2019.01)
*G05D 1/00*    (2006.01)
*G05D 1/04*    (2006.01)
*G06K 9/62*    (2022.01)
*G06F 16/583*  (2019.01)
(Continued)

(52) U.S. Cl.
CPC ....... *G06F 16/5854* (2019.01); *G05D 1/0094* (2013.01); *G05D 1/042* (2013.01); *G06F 16/51* (2019.01); *G06K 9/6267* (2013.01); *G06T 7/97* (2017.01); *G06V 20/20* (2022.01); *H04N 5/23222* (2013.01); *G06V 2201/08* (2022.01)

(58) Field of Classification Search
CPC .................................................. G06F 16/5854
See application file for complete search history.

(56) References Cited

U.S. PATENT DOCUMENTS 9,421,869 B1 *   8/2016   Ananthanarayanan .. B64D 5/00
9,720,413 B1 *   8/2017   Lerna ..................... B64C 39/024
(Continued)

FOREIGN PATENT DOCUMENTS

CN   108665373   10/2018   ............. G06Q 40/08

OTHER PUBLICATIONS

U.S. Appl. No. 16/557,503, filed Aug. 30, 2019, Garcia.
(Continued)

*Primary Examiner* — Irfan Habib
(74) *Attorney, Agent, or Firm* — Hayes Soloway P.C.

(57) ABSTRACT

Disclosed is a method for the physical, in particular optical, detection of at least one usage object. The method includes the step of carrying out at least one physical detection process, for example by a user and/or an implementation device, in particular of at least one photograph, of the usage object, so that the usage object may be detected in such a way that an image of the usage object as detected during the detection process is shown at the same time as the database object shown on the screen in an identical manner or in a manner identical to scale, wherein as a result of the detection process, the usage object is associated with at least one usage object class, for example a vehicle type, by the processing unit and/or the CPU and/or the user.

10 Claims, 5 Drawing Sheets

(51) Int. Cl.
    *G06T 7/00*        (2017.01)
    *H04N 5/232*     (2006.01)
    *G06V 20/20*     (2022.01)

(56) References Cited

U.S. PATENT DOCUMENTS

| | | | | |
|---|---|---|---|---|
| 9,753,461 | B1* | 9/2017 | Johnson | G01R 31/085 |
| 9,878,787 | B2* | 1/2018 | Chan | B64C 39/024 |
| 10,418,853 | B2* | 9/2019 | Yang | B64D 47/08 |
| 10,540,905 | B2* | 1/2020 | Bohanan | G08G 5/04 |
| 10,614,578 | B2* | 4/2020 | Yamin | G08B 25/08 |
| 10,909,366 | B2* | 2/2021 | Mullally | G06V 10/25 |
| 2010/0209891 | A1* | 8/2010 | Lin | G09B 9/05 |
| | | | | 434/66 |
| 2013/0034266 | A1* | 2/2013 | Shamir | G06T 7/246 |
| | | | | 382/103 |
| 2014/0240498 | A1* | 8/2014 | Ohtomo | G05D 1/0094 |
| | | | | 348/144 |
| 2014/0251743 | A1* | 9/2014 | Childress | B64C 39/022 |
| | | | | 191/12 R |
| 2015/0043771 | A1* | 2/2015 | Wu | G06V 20/40 |
| | | | | 382/103 |
| 2015/0314434 | A1* | 11/2015 | Bevins, Jr. | H02G 1/02 |
| | | | | 408/124 |
| 2016/0068264 | A1* | 3/2016 | Ganesh | G06Q 30/0637 |
| | | | | 701/4 |
| 2016/0130010 | A1* | 5/2016 | Keennon | B64C 11/32 |
| | | | | 244/17.13 |
| 2016/0152345 | A1* | 6/2016 | Molnar | B64C 39/024 |
| | | | | 244/39 |
| 2016/0364004 | A1* | 12/2016 | Ekandem | G06V 40/28 |
| 2017/0010623 | A1* | 1/2017 | Tang | B64D 47/08 |
| 2017/0075359 | A1* | 3/2017 | Wang | G01C 21/1652 |
| 2017/0116867 | A1* | 4/2017 | Cherepinsky | G08G 5/045 |
| 2017/0139409 | A1* | 5/2017 | Clarke | G08G 5/0082 |
| 2017/0221394 | A1* | 8/2017 | Garcia Morchon | G09F 19/18 |
| 2017/0235300 | A1* | 8/2017 | Maruno | G06T 7/246 |
| | | | | 700/112 |
| 2018/0025392 | A1 | 1/2018 | Helstab | G06Q 30/02 |
| 2018/0046187 | A1* | 2/2018 | Martirosyan | B64D 47/08 |
| 2018/0244387 | A1* | 8/2018 | Russell | G08G 5/0021 |
| 2018/0285888 | A1* | 10/2018 | Staebler | G06Q 10/0833 |
| 2019/0047696 | A1* | 2/2019 | Gwin | B25J 15/00 |
| 2019/0094149 | A1* | 3/2019 | Troy | G05D 1/0094 |
| 2019/0149724 | A1* | 5/2019 | Wu | H04N 5/23222 |
| | | | | 348/144 |
| 2020/0406860 | A1* | 12/2020 | Mai | B60R 25/31 |
| 2021/0008958 | A1* | 1/2021 | Porta | G06V 40/18 |

OTHER PUBLICATIONS

EP Extended Search Report issued in related EP Patent Application Serial No. 21 168 842.9, dated Jul. 19, 2021, with machine translation (16 pages).
EP Extended Search Report issued in related EP Patent Application Serial No. 20 170 194.3, dated Sep. 9, 2020 with machine translation (15 pages).
"Coverage Path Planning with Adaptive Viewpoint Sampling to Construct 3D Models of Complex Structures for the Purpose of Inspection", Almadhoun et al., 2018 IEEE/RSJ International Conference on Intelligent Robots and Systems (IROS), IEEE, Oct. 1-5, 2018, pp. 7047-7054.
German Official Action issued in related German Patent Application Serial No. 10 2019 110 345.2, dated Mar. 5, 2020 with machine translation (26 pages).
Volker Zota, "Yuneec Breeze 4K: Selfie Drone for Adventurers" accessed online Aug. 30, 2016, https://www.heise.de/-3308326, downloaded on Mar. 5, 2020 (with machine translation—4 pages).
Official Action issued in parent U.S. Appl. No. 16/557,503, dated Mar. 18, 2021 (7 pages).
Official Action issued in parent U.S. Appl. No. 16/557,503, dated Dec. 24, 2020 (12 pages).
Official Action issued in parent U.S. Appl. No. 16/557,503, dated Sep. 15, 2020 (11 pages).

* cited by examiner

METHOD FOR THE PHYSICAL, IN PARTICULAR OPTICAL, DETECTION OF AT LEAST ONE USAGE OBJECT

CROSS REFERENCE TO RELATED APPLICATION

This application is a divisional application of U.S. patent application Ser. No. 16/557,503, filed Aug. 30, 2019, the contents of which are incorporated herein by reference.

DESCRIPTION

The present application relates to a method for the physical, in particular optical detection of at least one usage object as well as to a corresponding apparatus. Previous methods for associating a usage object with a usage object class are low in cost, but they are rather inaccurate.

As a rule, a photograph of a usage object is taken to this end, so as to be able to identify it by its structural and/or haptic features. A database was often used for this purpose in order to compare the usage object shown on the photograph with usage objects deposited in a database, however this comparison was often incorrect and inaccurate because small optical and/or data-related details are often very important for such a comparison. It is an object of the present application to avoid such inaccuracies and/or error occurrences in the comparison between the usage object captured and a usage object deposited in the database.

A solution to the above problem is therefore provided in patent claim 1 as herewith claimed and presented.

It is therefore an object of the present invention to provide a method for the physical, in particular optical, detection of at least one usage object, which is not only inexpensive and time-saving, but moreover offers a particularly high level of accuracy in the comparison between the usage object and a usage object deposited in a database, in order to be able to identify a usage object uniquely, preferably biuniquely.

According to at least one embodiment, the method presented herein for the physical, in particular optical, detection of at least one usage object comprises at least the provision of a usage object. The usage object may generally be an object, in particular a three-dimensional object, that is provided for usage or is to be provided for usage or includes a usage. The term "use" in terms of the application means here any handling with regard to a purpose.

According to at least one embodiment, at least one processing unit is provided in particular in a second step, by means of which the usage object and/or an identification means that is uniquely, preferably biuniquely associated with a usage object is physically detected, so that at least one characteristic value of the usage object is obtained.

The processing unit may be a computing and/or storage unit. Preferably, the processing unit is also adapted and intended for producing photographs. To this end, the processing unit may include at least one camera or at least a part of a camera. For example, the usage object is designed to be portable, which means that the usage object cannot be connected to a floor or to a handling device connected to the floor element. In terms of the invention, the word "portable" may mean in particular that the processing element has such dimensions and such a weight so as to be adapted and intended to be manually held in particular in one hand. As an alternative to this, the processing unit may also be detachably or non-detachably connected to a floor, on which the usage object is erected. Such a connection may be provided via the handling device as described above. In this embodiment, the processing unit may be guided along guide paths, for example along at least one rail or a rail system relative to the usage object.

According to at least one embodiment, a usage object classification is carried out in particular in a third step, insofar as the characteristic value is compared with a in a database of the processing unit and/or with a database of an external CPU, in that the processing unit and/or the CPU and/or the user him/herself selects a data object corresponding to the characteristic value and displays it on a screen of the processing unit, so that a camera image of the usage object is at least partially optically shown on the screen, superimposed and/or juxtaposed with at least the data object.

The characteristic value may be a real number greater than 0, however, it is also conceivable for the characteristic value to be made up of various partial characteristic values. A usage object can therefore have for example a partial characteristic value with respect to an external colour, a further characteristic value in respect of maximum dimensions in height and width and/or depth, as well as a further partial characteristic value with respect to weight. For example, such a characteristic value may therefore be formed by the combination of these three characteristic sub-values. A combination may be carried out in the form of a sum or of a fraction. Preferably however, the characteristic value is determined in the form of a sum of the above-mentioned characteristic sub-values. The individual characteristic sub-values however may also be included in the summation with different weightings. To this end it is conceivable that each characteristic sub-value has as a weighting factor a first weighting factor, the second characteristic sub-value has a second weighting factor and a third characteristic sub-value has a third weighting factor, according to the following formula:

$$K=G1*K1+G2*K2+G3*K3,$$

wherein the values K1 to K3 represent the respective sub-values and the factors G1 to G3 (which represent real positive numbers) each identify weighting factors of the characteristic sub-values. The usage object classification presented here may be a purely optical comparison between the usage object as captured using a camera as mentioned above and a usage object template correspondingly deposited in the database in an optical manner.

It would however also be possible for the usage object to be subdivided or categorised from a data point of view into individual object classes. Insofar, instead of an (analogue) and optical comparison between the captured usage object and the usage object as deposited in the database, a data-related, for example analogue comparison is carried out. Therefore, a conversion unit is used to break down the usage object into individual data elements, for example data classes, which data classes will then be individually or commonly compared with data or data classes correspondingly deposited in the database.

The data object may correspondingly be a template image of the corresponding usage object, which is deposited in the database. Once the characteristic value of the usage object has been determined, it may be conceivable to select, on the basis of the characteristic value, the corresponding database object which can optically image the usage object, so as to be displayed on the display next to the actually captured usage object.

According to at least one embodiment, a process for detecting the usage object is carried out in a further step for example by a user and/or an implementation device, so that the usage object is detected in such a way that an image of the usage object detected by the detection process, is displayed at the same time as the database object shown on the screen in an identical manner or in a manner identical to scale. In this context, "identical" means a closest approximation to a usage object correspondingly deposited in the database, on the basis of the characteristic value and/or the optical dimension of the usage object. This may mean that the usage object that can be detected by the processing unit does not necessarily correspond in all dimensions and in terms of wear and tear to the usage object identified in the database in correspondence with the characteristic value, but the greatest match is produced on the basis of the predetermined minimum dimensions.

It is conceivable for the usage object to be a vehicle, for example a BMW 3 series. The usage object itself may for example have a spoiler and/or a lowered chassis. If a corresponding usage object also with an additional spoiler and a lowered chassis version has not been deposited in the database, but the database only has a general base model of a BMW 3 series, the processing unit and/or the database and/or the external CPU can still select this base model 3 series as the closest match with the usage object, for example also because the characteristic values of the usage object are identical, for example on the basis of a vehicle badge.

By means of the usage object classification mentioned above, in connection with the corresponding implementation on the basis of the physical detection process, it may be achieved that as a result of the detection process, the usage object is associated by the processing unit and/or the CPU and/or the user to at least one usage object class, for example a vehicle type.

The vehicle type may, as already described above, be for example a BMW 3 series or any other vehicle licensed for usage on German roads or on the international road system.

According to at least one embodiment, the method for the physical, in particular optical detection of at least one usage object, initially comprises a first step whereupon a usage object is provided, wherein in a second step at least one processing unit is provided, by means of which the usage object and/or an identification means that is uniquely, preferably biuniquely associated with the usage object, is physically detected, from which at least one characteristic value of the usage object is obtained.

In a next step, a usage object classification is carried out, namely insofar as the characteristic value is compared with at least one in a database of the processing unit and/or with a database in an external CPU, and the processing unit 2 and/or the CPU and/or the user him/herself selects a database object corresponding to the characteristic value and displays it on a screen of the processing unit, so that a camera image of the usage object together with the database object is displayed at least partially optically on the screen superimposed and/or juxtaposed.

Further, in a subsequent step, at least one physical detection process is carried out for example by a user and/or an implementation device, in particular at least one photograph of the usage device is taken, so that the usage object is detected in such a manner that an image of the usage object, which was detected by the detection process, is shown at the same time with a database object shown on the screen either in an identical manner or in a manner identical to scale, wherein as a result of the detection process, the usage object is associated by the processing unit 2 and/or the CPU and/or the user with at least one usage object class, for example a vehicle type.

According to at least one embodiment, the physical detection process comprises at least one temporal detection sequence, where during the detection sequence, at least two different images of the usage object are captured, wherein each image is associated with at least one database object.

For example, the detection sequence detects an instruction to an implementation device and/or to a user to take a photograph of the usage object from different angles, from different distances with various colour contrasts or the like, in order to simplify an identification using a usage object deposited in the database.

According to at least one embodiment, after the characteristic value-related detection and for usage object class identification on the screen, at least one temporally sequential detection instruction for detecting at least two photographs is provided. In particular, such a method step is carried out along this temporal detection sequence. The detection sequence may therefore include accurate instructions to the user and/or to an implementation device in respect of the location, to a capturing brightness or the like, so that the processing unit, which preferably comprises an optical camera, optically moves along the usage object along specified points.

For a more accurate orientation at specific orientation points of the usage object, at least one, preferably however several orientation points may preferably also be detachably attached to the usage object. Such orientation points may be marking elements that can be captured by the camera of the processing unit in a particularly simple manner. For example, the marking elements may be barcodes and/or NFC chips.

Such marking elements may therefore also be passive components. However, it is also conceivable to attach such marking elements to the usage object in a detachable manner, for example by gluing them on. Such usage objects may have their own energy supply, for example a battery supply. Such marking elements provided with a battery may emit electromagnetic rays in the optically visible or invisible, for example in the infrared or microwave range, which may be detected by a localisation element of the processing unit, and as a result of which the processing unit is able to determine in which position it is located in relation to the usage object.

Alternatively or in addition however it is also conceivable for the marking elements to be virtual marking elements which are loaded from the database and which, like the usage object itself, may be represented from the database as an image, for example as a third image together with a photograph of the usage object and correspondingly as an appearance of the usage object that was virtually loaded from the database on the screen of the usage object, and may therefore be deposited, like the database objects (which may image the usage object in a virtual respect and which are stored in the database), also as further database objects in the database of the processing unit and/or of the external CPU. For example, using one and the same characteristic value, both the usage object and the further database object (at least one marking element) are loaded into the processing unit together and/or are displayed on the screen of the processing unit.

According to at least one embodiment, the temporally sequential detection instruction specifies to the user a detection distance and/or a detection angle relative to the usage object.

As has already been mentioned above, the detection instruction therefore provides an accurate flow chart, preferably in a fully automatic respect in relation to the capturing of the individual images, in particular photographs of the usage objects.

According to at least one embodiment, the characteristic value is taken, in particular scanned, from an identification means, for example from a usage badge of the usage object. The characteristic value is therefore also captured preferably fully automatically by the processing unit, which includes for example an optical camera. Preferably, it is no longer necessary for the user and/or the implementation device to input the characteristic value manually into the processing unit.

According to at least one embodiment, the processing unit comprises or is a smart phone or a camera. If the processing unit is a smart phone or a camera, then this may, as was already mentioned above, be handled manually.

According to at least one embodiment, the processing unit is fixed to a capturing element that moves relative to the usage object in accordance with the specifications provided by the detection sequence. The processing unit may therefore move together with the capturing element in correspondence with the detection sequence relative to the usage object. Whilst in such a case the processing unit may be or comprise a smart phone or a camera, the processing unit may still be a handlable processing unit. However, this is fixed to a larger unit, namely the capturing element. Preferably, the capturing element comprises all the necessary components so as to be movable along the usage object fully automatically or by manual force of the user.

According to at least one embodiment, the capturing element is a drone that is steered in correspondence with the detection sequence relative to the usage object so as to be able to carry out the individual images preferably along or on the above-mentioned marking elements.

In terms of the invention, a "drone" may be a pilotless vehicle, preferably a pilotless flying device having one or more helicopter rotors. The drone may then be controlled manually or fully automatically, and thus steered, in a wireless or wired manner via a control unit by the user and/or by the implementation device.

Insofar, it is possible whilst capturing the usage object using the drone, to proceed in a very space-saving manner around the usage object. In particular, a safety distance of the usage object from other usage objects, for example other cars of a car showroom, may be dispensed with, so that the drone preferably moves along the individual positions to be photographed in accordance with the detection sequence, without there being any need to move other usage objects, which are not involved, very far away. The drone would then simply approach the usage object from the top and would for example also move into the interior of the car in order to be able to capture images of the inside.

According to at least one embodiment, the detection sequence also comprises control data with regard to the flying altitude of the drone, so that the drone flies along the detection sequence in a lateral respect, preferably fully automatically. Once for example a certain detection sequence using the above mentioned marking elements has been called up by the processing unit, which detection sequence may be specified by the user and/or the implementation device, a fully automatic process may be executed, which may be terminated by the unique or preferably the biunique identification of the usage object by means of a usage object deposited in the database.

Further, the present invention comprises a corresponding apparatus, in particular an apparatus for the physical, in particular optical detection of at least one usage object.

The apparatus described here has the same features as the method described here, and vice versa.

In particular, the apparatus described here comprises at least one processing unit, by means of which a usage object and/or an identification means that is uniquely, preferably biuniquely associated with a usage object, is physically detected, from which at least one characteristic value of the usage object can be obtained, and wherein further the processing unit and/or a CPU is adapted and intended to carry out a usage object classification insofar as a characteristic value of the usage object may be compared with at least one in a database of the processing unit and/or with a database of an external CPU, and the processing unit and/or the CPU and/or the user him/herself selects a database object corresponding to a characteristic value and displays it on a screen of the processing unit, so that a camera image of the usage object can be displayed together with a data object on the screen at least partially optically superimposed and/or juxtaposed.

According to at least one embodiment, the apparatus presented here comprises, for the physical, in particular the optical detection of at least one usage object, at least one providing of a usage object at least one processing unit, by means of which a usage object and/or an identification means that is uniquely, preferably biuniquely, associated with the usage object, may be physically detected, from which at least one characteristic value of the usage object may be obtained, and wherein further the processing unit and/or a CPU is adapted and intended to carry out a usage object classification insofar as a characteristic value of the usage object may be compared with at least one in a database of the processing unit and/or with a database of an external CPU, and the processing unit and/or the CPU and/or the user him/herself selects a database object corresponding to the characteristic value and displays it on the screen of the processing unit, so that a camera image of the usage object can be displayed together with a data object on the screen at least partially optically superimposed and/or juxtaposed.

According to the invention, by means of the processing unit and/or the CPU at least one physical detection process, in particular at least one photograph, of the usage object, on the basis of the database object imaged on the screen is carried out, so that the user detects the usage object in such a way that an image of the user object as detected by the detection process is shown at the same time with the database object shown on the screen in an identical manner or in a manner identical to scale, wherein as a result of the detection process, the usage object can be associated with at least one usage object class, for example a vehicle type by the processing unit and/or the CPU and/or the user.

The usage object may generally be an object supplied or to be supplied for usage or an object including a usage, in particular a three-dimensional object. The term "use" in terms of the application means any handling in respect of a purpose.

The processing unit may be a computing and/or storage unit. Preferably, the processing unit is also adapted and intended for producing photographs. To this end, the processing unit may comprise at least one camera or at least a part of a camera. For example, the usage object is designed to be portable, which means that the usage object cannot be connected to a floor or to a handling device connected with the floor element. "Portable" may mean in particular in terms of the invention that the processing unit has such dimensions and such a weight that it is adapted and intended for being held manually in particular in one hand. As an alternative, the processing unit may also be detachably or non-detachably connected to a floor, on which the usage object is erected. Such a connection may be produced using the handling device described above. In this embodiment, the processing unit may be guided along guide paths, for example along at least one rail or a rail system relative to the usage object.

The characteristic value may be a real number greater than 0, however it is also conceivable for the characteristic value to be composed of various characteristic sub-values. A usage object may therefore for example have a characteristic sub-value in respect to an external colour, a further characteristic value in respect of maximum dimensions in height and width and/or depth, as well as a further characteristic sub-value in respect of weight. For example, such a characteristic value may therefore be formed by the combination of these three characteristic sub-values. A combination may be carried out in the form of a sum or of a fraction. Preferably however the characteristic value is determined in the form of a sum of the above-mentioned characteristic sub-values. The individual characteristic sub-values, however, may also be included in the summation with different weightings. To this end, it is conceivable that each characteristic sub-value has a first weighting factor as the weighting factor, that the second characteristic sub-value has a second weighting factor and a third characteristic sub-value has a third weighting factor, according to the following formula:

$$K=G1*K1+G2*K2+G3*K3,$$

wherein the values K1 to K3 represent the respective sub-values and the factors G1 to G3 (which are real positive numbers) respectively identify weighting factors of the characteristic sub-values. The usage object classification shown here may be a purely optical comparison between the usage object captured using the above-mentioned camera and a corresponding usage object template deposited in the database in an optical manner.

However it would also be possible for the usage object to be subdivided or categorised into individual object classes in a data-related manner. Insofar, instead of an (analogue) and optical comparison, a data-related, for example analogue comparison is carried out between the captured usage object and the usage object deposited in the database. The usage object is therefore broken down by a conversion unit into individual data, for example data classes, wherein these data classes are then compared, individually or together, with corresponding data or data classes deposited in the database.

The data object may be a template of the corresponding usage object, which is deposited in the database. Once the characteristic value of the usage object has been determined, it may be conceivable to select, using the characteristic value, the corresponding database object which can optically image the usage object, so as to be presented on the screen next to the actually captured usage object.

According to at least one embodiment, the processing unit is adapted and intended to enable a detection process to be carried out for example by a user and/or an implementation device of the usage object, so that the usage object is detected in such a way that an image of the usage object as detected by the detection process is displayed on the screen at the same time as the database object in an identical manner or in a manner identical to scale. "Identical" means in this context a closest approximation, on the basis of the characteristic value and/or the optical dimensions of the usage object, to a usage object correspondingly deposited in the database. This may mean that the usage object that can be detected by the processing unit does not correspond in all dimensions and in respect of wear and tear to the usage object identified in the database in correspondence with the characteristic value, however the closest match is produced on the basis of predetermined minimum dimensions.

It is conceivable for the usage object to be a vehicle, for example a BMW 3 series. The usage object itself may for example have a spoiler and/or a lowered chassis. If a corresponding usage object also with an additional spoiler and a lowered chassis version has not deposited in the database, but the database only includes generally a base model of a BMW 3 series, the processing unit and/or the database and/or the external CPU can still select this basic model 3 series as the closest match with the usage object, for example also because the characteristic values of the usage object are identical, for example on the basis of a vehicle badge.

By means of the above-mentioned usage object classification in conjunction with the corresponding implementation on the basis of the physical detection process, it may be achieved that as a result of the detection process, the usage object is associated with at least one usage object class, for example a vehicle type, by the processing unit and/or the CPU and/or the user.

The vehicle type may, as already described above, for example be a BMW 3 series or any other vehicle licensed for use on German roads or on the international road system.

According to at least one embodiment, the physical detection process comprises at least one temporal detection sequence, where during the detection sequence, at least two different images of the usage object are captured, wherein each image being associated with at least one database object.

For example, the detection sequence detects an instruction to an implementation device and/or to a user to take a photograph of the usage object from different angles, from different distances with different colour contrasts or the like, in order to simplify an identification using a usage object deposited in the database.

According to at least one embodiment, after the characteristic value-related detection and for usage object class identification on the screen, at least one temporally sequential detection instruction of the temporal detection sequence is carried out in order to detect at least two captured images. In particular, the processing unit is adapted and intended to move along this lateral detection sequence. The detection sequence may therefore include, in respect of the location, of a capturing brightness or similar, accurate instructions to the user and/or an implementation device, so that the processing unit, which preferably comprises an optical camera, optically moves along the usage object along specified points.

For a more accurate orientation on special orientation points of the usage object, at least one, preferably however several orientation points may be preferably also detachably attached to the usage object. Such orientation points may be marking elements which can be captured by the camera of the processing unit in a particularly simple manner. For example, the marking elements may be barcodes and/or NPC chips.

Such marking elements may therefore also be passive components. However, it is also conceivable for such marking elements to be detachably attached to the usage object, for example by gluing them on. Such usage objects may have their own energy supply, for example a battery supply. Such marking elements provided with a battery may emit electromagnetic rays in the optically visible or invisible, for example the infrared or microwave range, which can be detected by a localisation element of the processing unit, so that the processing unit is able to determine in which position it is located relative to the usage object.

However, alternatively or in addition it is also conceivable for the marking elements to be virtual marking elements that are loaded from the database and are shown, like the usage object itself, from the database as an image, for example as a third image together with a photograph of the usage object and, correspondingly as an appearance of the usage object that was virtually loaded from the database, on the screen of the usage object, can therefore be deposited, like the database objects (which can image the usage objects in a virtual respect and which are stored in the database), as further database objects in the database of the processing unit and/or of the external CPU. For example, one and the same characteristic value can be used to load both the usage object and the further database object (at least one marking element) together into the processing unit and/or to display them on the screen of the processing unit.

According to at least one embodiment, the temporally sequential detection instruction specifies to the user a detection distance and/or a detection angle relative to the usage object.

As has already been mentioned above, the detection instruction therefore provides an accurate flow chart, preferably in a fully automatic respect, in relation to the capturing of the individual images, in particular photographs of the usage objects.

According to at least one embodiment, the characteristic value is taken, in particular scanned, from an identification means, for example a usage badge of the usage object and/or can be taken therefrom. The characteristic value is therefore also captured preferably fully automatically by the processing unit which comprises for example an optical camera. Preferably, it is no longer necessary for the user and/or the implementation device to input the characteristic value manually into the processing unit.

According to at least one embodiment, the processing unit is or comprises a smart phone or a camera. If the processing unit is a smart phone or a camera, it may, as has already been mentioned above, be handled manually.

According to at least one embodiment, the processing unit is fixed to a capturing element that moves relative to the usage object in accordance with the specifications provided by the detection sequence. The processing unit may therefore move relative to the usage object together with the capturing element in correspondence with the detection sequence. Whilst in such a case the processing unit may be or comprise a smart phone or a camera, the processing unit may still also be a handlable processing unit. However, this is fixed to a larger unit, namely the capturing element. Preferably, the capturing element comprises all the necessary components so as to be movable along the usage object fully automatically or by manual force of the user.

According to at least one embodiment, the capturing element is a drone that is steered relative to the usage object in accordance with the detection sequence so as to be able to carry out the individual images preferably along or on the above-mentioned marking elements.

In terms of the invention, a "drone" may be a pilotless vehicle, preferably a pilotless flying device having one or more helicopter rotors. The drone may then be controlled manually or fully automatically and thus steered, in a wireless or a wired manner via a control unit by the user and/or by the implementation device.

It is therefore possible by means of the drone to proceed around the usage object during the capturing of the usage object in a very space-saving manner. In particular, a safety distance of the usage object from other usage objects, for example other cars in a car showroom may be dispensed with, so that the drone preferably moves along the individual positions to be photographed in correspondence with the detection sequence, without any non-involved usage objects having to be driven too far away. The drone would then simply approach the usage object from the top and move for example also move into the interior of the car so as to be able to capture images of the inside.

According to at least one embodiment, the detection sequence also comprises control data regarding the flying altitude of the drone, so that the drone flies along the detection sequence in a lateral respect, preferably fully automatically. Once for example a certain detection sequence has been called up by the processing unit on the basis of the above-mentioned marking elements, which detection sequence may be specified by the user and/or the implementation device, a fully automatic process may be executed, which may be terminated by the unique or preferably biunique identification of the usage object with a usage object deposited in the database.

Moreover, one aspect of the invention may be that by means of the processing unit and/or the CPU, at least one physical detection process may be carried out, in particular at least one photograph of the usage object may be taken on the basis of the database image shown on the screen, so that the user detects the usage object in such a way that an imaging of the usage object as detected by the detection process is displayed on the screen at the same time as the database object in an identical manner or in a manner identical to scale, wherein as a result of the detection process, the usage object can be associated with at least one usage object class, for example a vehicle type, by the processing unit and/or the CPU and/or the user.

The further embodiments of the above-described apparatus may be laid out in the same way, in particular with the same features as the above-described method.

Further advantages and embodiments result from the attached drawings, wherein.

Figure 1:
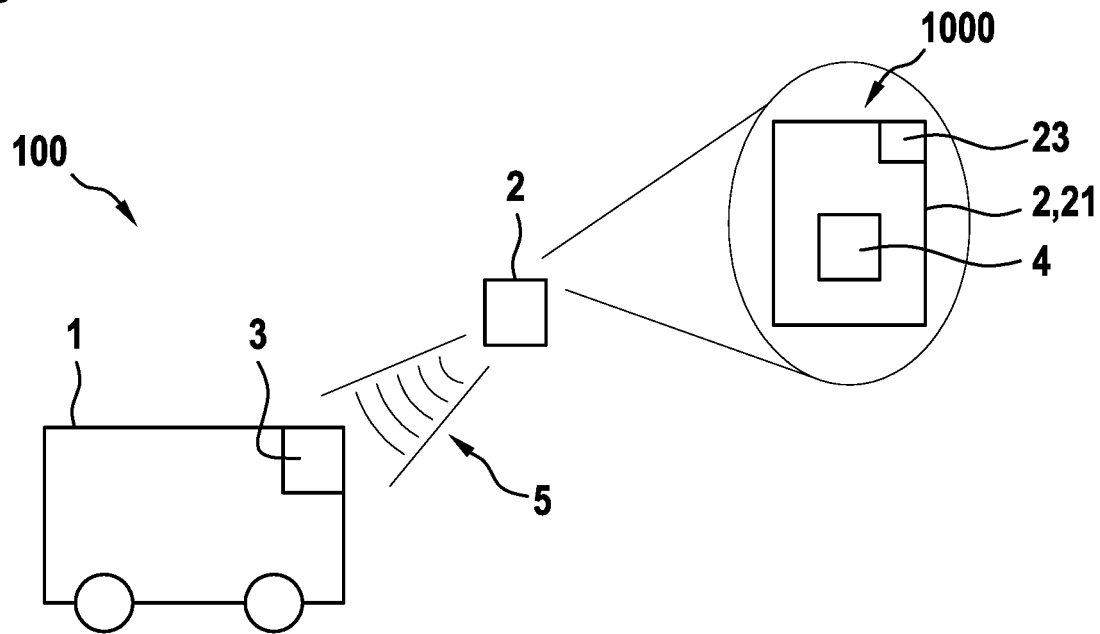
FIG. 1 to 2C show both an apparatus and a method according to the invention as described here.

In the figures, same or similar components are each provided with the same reference numerals. FIG. 1 shows an apparatus 100 according to the invention as well as a method according to the invention, with the apparatus 100 being adapted and intended to detect a usage object in a physical respect, in particular optically.

As can be seen from FIG. 1, the apparatus 100 comprises a processing unit 2, by means of which a usage object 1 and/or a usage object 1 is associated uniquely and preferably biuniquely, which the identification means 11 physically detects, from which at least one characteristic value of the usage object can be obtained, and wherein further the processing unit 2 and/or a CPU is adapted and intended to carry out a usage object classification insofar as a characteristic value of the usage object can be compared at least with one in a database of the processing unit 2 and/or with a database of an external CPU, and the processing unit 2 and/or the CPU and/or the user him/herself selects a database object 4 corresponding to the characteristic value 3 and displays it on a screen of the processing unit 2, so that a camera image of the usage object 1 together with the database object 4 can be shown on the screen 21 at least partially optically superimposed and/or juxtaposed.

By means of the processing unit 2 and/or the CPU it is possible to carry out at least one physical detection process 5 on the basis of the database object 4 imaged on the screen 21, so that the user detects the usage object 1, that an image of the usage object as detected by the detection process is shown at the same time as the database object 4 shown on the screen 21 in an identical manner or in a manner identical to scale, however at least essentially identical, wherein as the result of the detection process, the usage object 1 can be associated with at least one usage object class, for example a vehicle type, by the processing unit 2 and/or the CPU and/or the user.

Figure 2A:
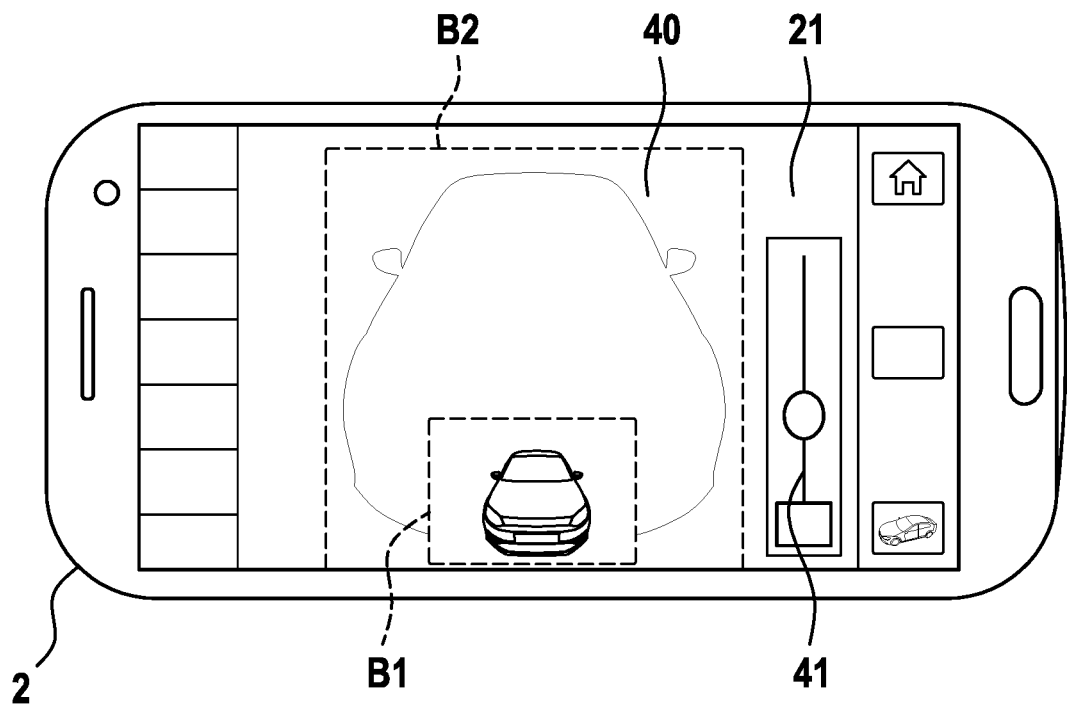

FIG. 2A shows an exemplary first step, wherein on the usage object 1 shown there, which is shown in the form of a smart phone, is optically shown on the screen 21 a usage object class (for example the images 30), in particular in the form of an exemplary vehicle type. The exemplary vehicle type is not only shown on the screen in a reduced form in the region B1, but is also shown in an enlarged, for example 1:1 form, with a grey shaded background, on the screen 21 (see region B2).

This optically shown usage object class, i.e. the vehicle type represented thereby, serves as an orientation on the object to be photographed. Also shown is a controller 40, which can be used to adjust a contrast and/or a brightness of the orientation image, i.e. in particular the images 30, which each correspond to an optical representation of a usage object class. Thus, any problems that occur in the case of high brightness can be eliminated.

Figure 2B:
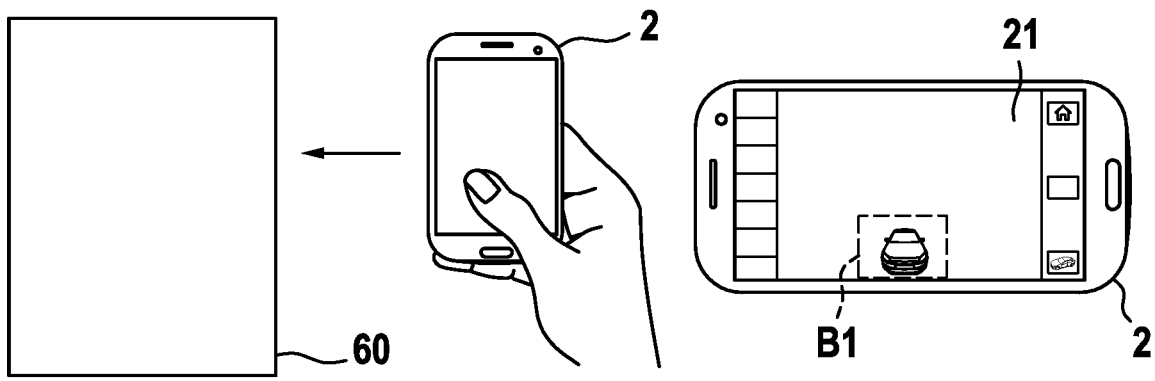

FIG. 2B shows a characteristic value-related detection by means of a usage badge 50 of the usage vehicle. Here, the usage badge 50 is optically scanned by the processing unit 2.

Depending on the usage object 1 to be photographed, the angle in which the processing unit 2 has to be kept changes, presently shown as a smart phone by way of example, as a result of which an optimum quality for the comparison and classification process can be achieved.

Figure 2C:
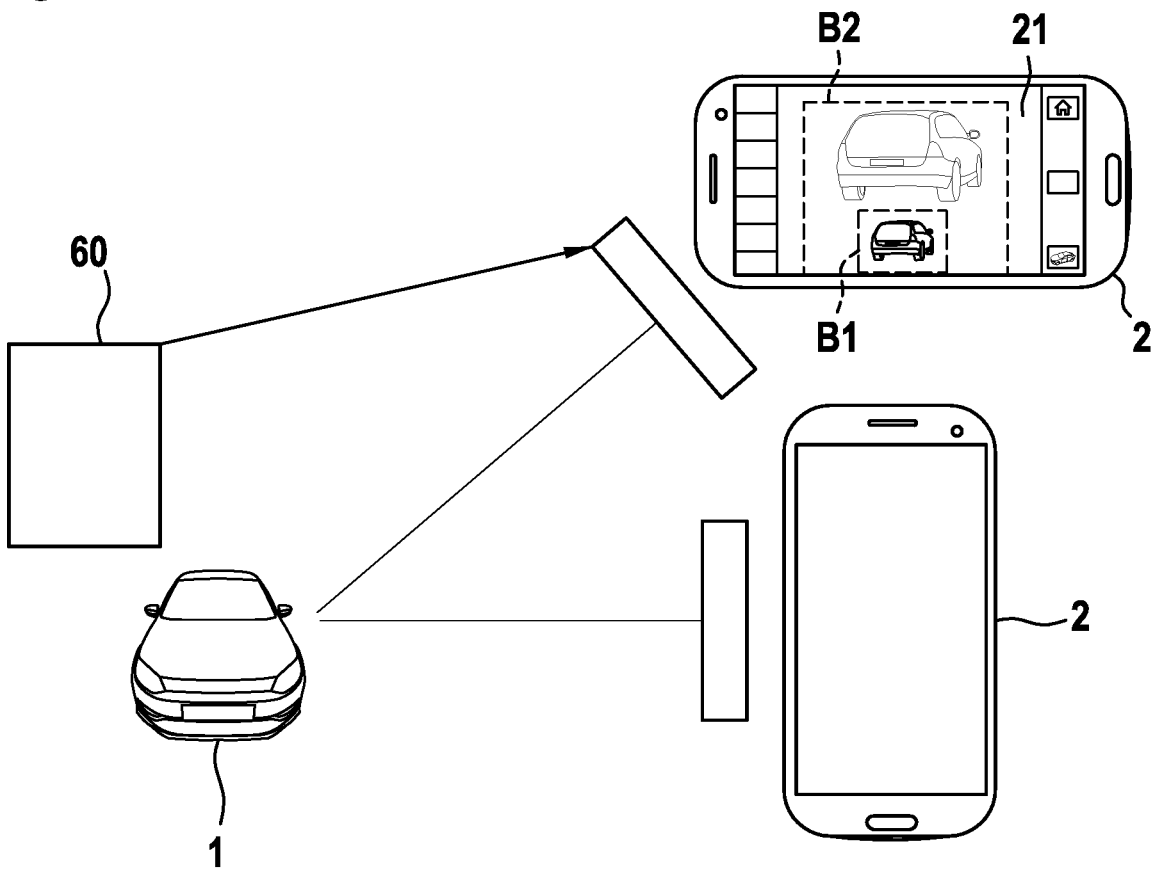

FIG. 2C shows a further illustration to show that the processing unit 2 has to be held in different angular positions relative to the usage object 1.

Therefore, the above not only shows the physical detection process 5, but also the characteristic value-related detection as described above for usage object classification.

FIG. 3 show in a further embodiment that the processing unit 2 is fixed to a capturing element 23, here a drone.

Figure 3A:
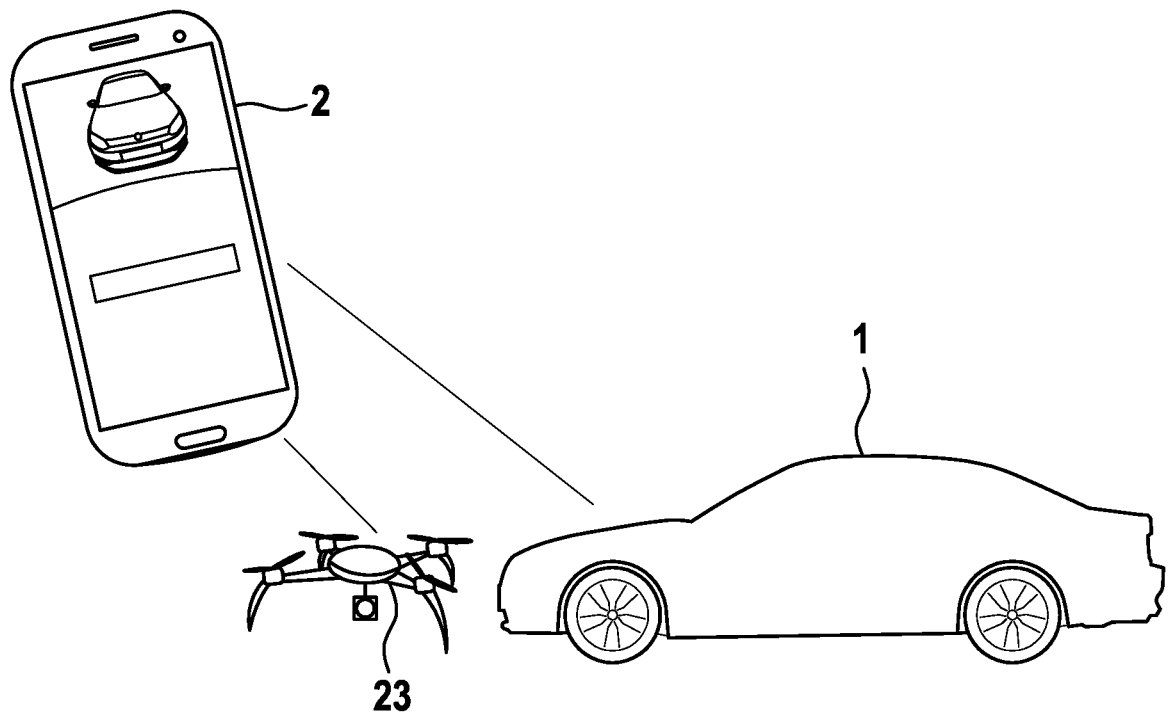
FIG. 3A-3E show a further embodiment of the method described here.
Figure 3B:
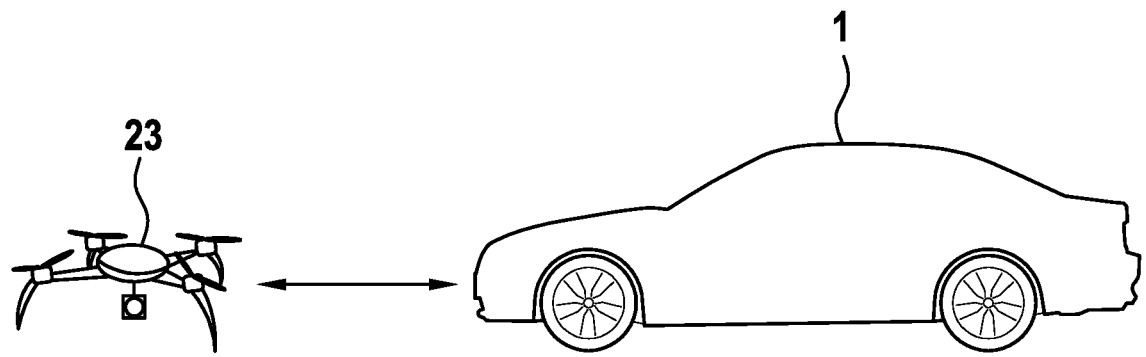

FIG. 3A therefore not only depicts a drone 23, but again also the processing unit 2 and the usage object 1, wherein in the case of a drone 23 initially, prior to the start of the drone, a distance is input into the processing unit 2 or is specified by the detection sequence.

Figure 3C:
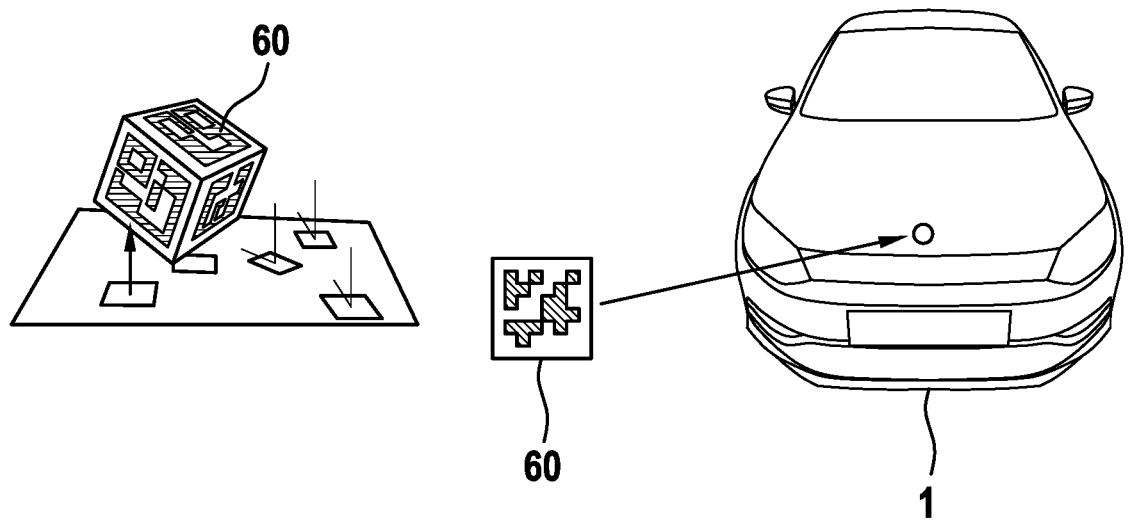

Before the drone can orient itself automatically and without a drone pilot, the latter needs information regarding the usage object 1. Subsequently, the drone may be placed in front of the vehicle 11 at a predefined distance (see FIG. 3B), so as to fly, on the basis of the vehicle dimensions, along all the positions in correspondence with the detection sequence in relation to the starting point. FIG. 3C shows corresponding marking elements 60, which are either attached to the usage object 1 or are virtually optically "superimposed".

The marking may be a so-called ARUCo-marking. These may be high-contrast symbols that were developed specifically for camera application. These may not only include orientation assistance, but also information. Using such markers, the drone 23 can therefore detect the starting point of the drone flight itself.

Figure 3D:
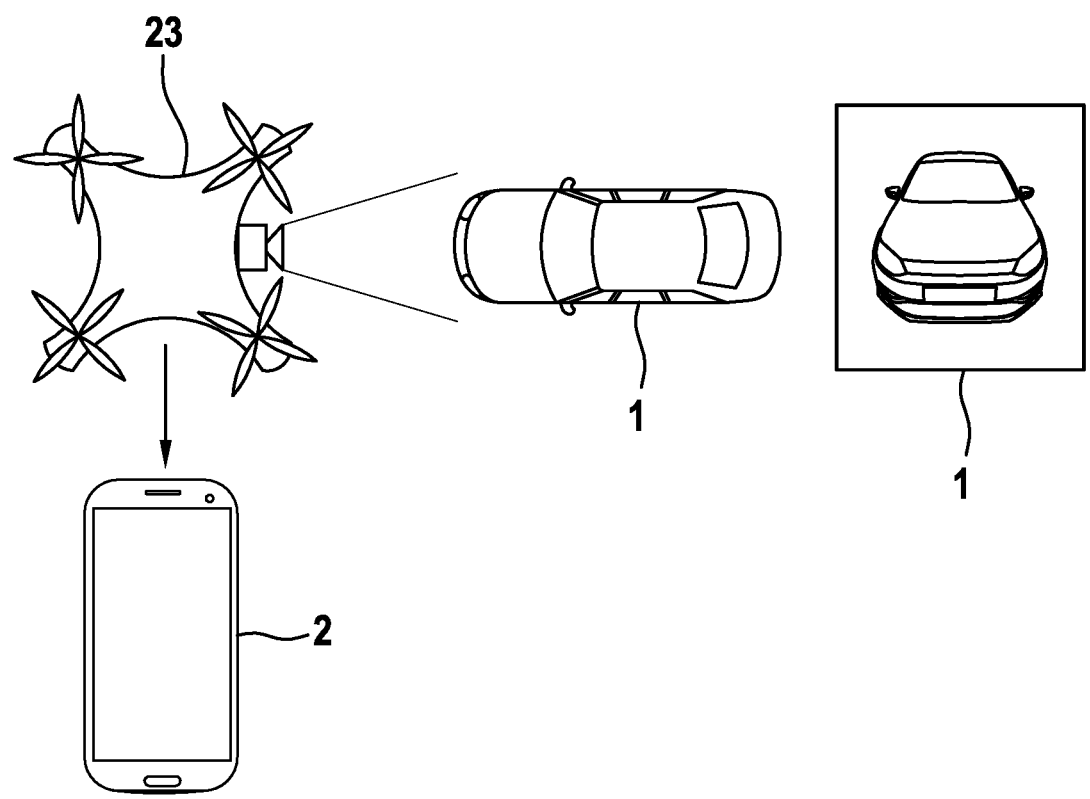
Figure 3E:
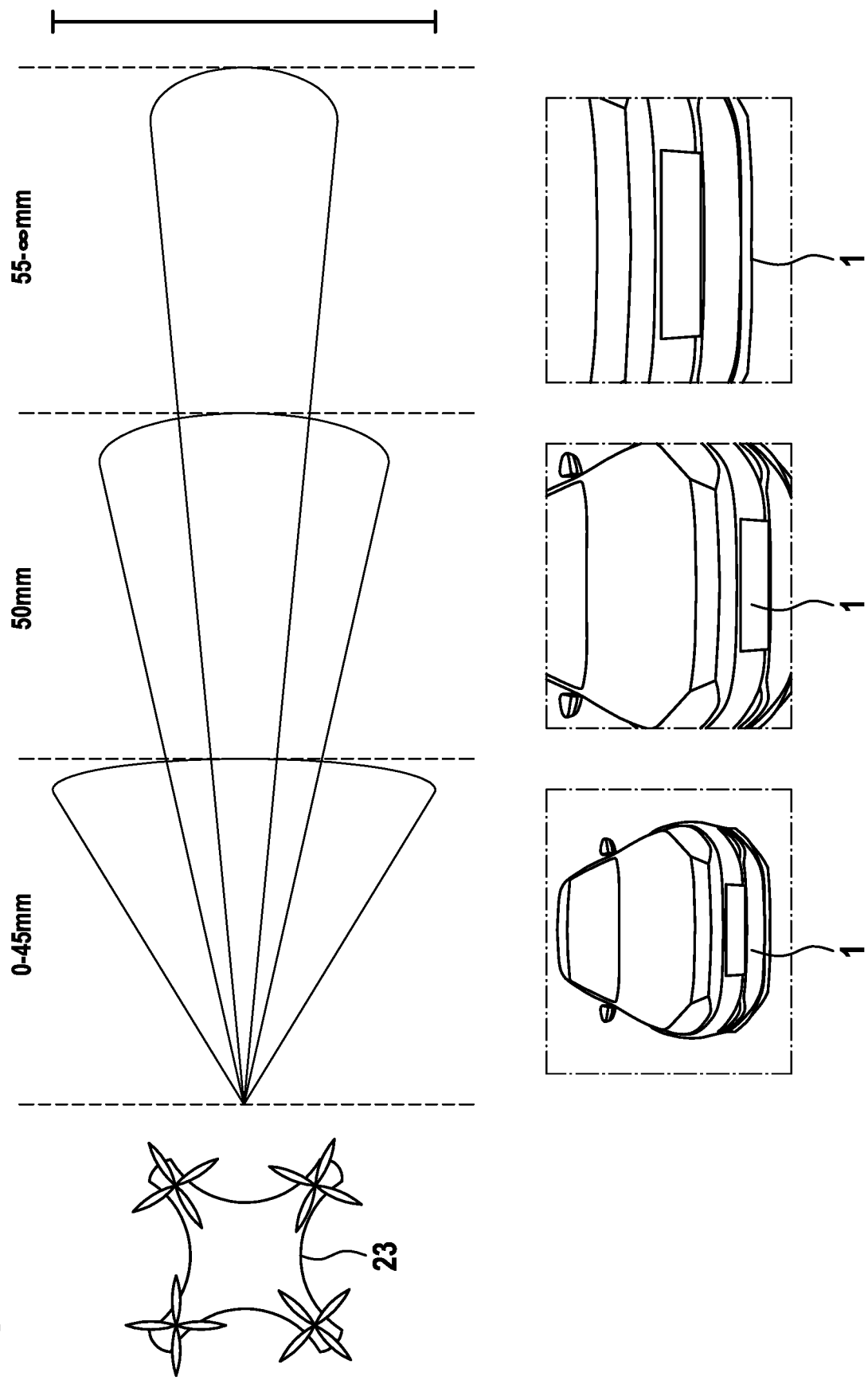

FIG. 3D shows another sequence of the drone flight, which can also be seen from FIG. 3E. However, in FIG. 3E, there is also additionally optically shown the effect that a focal length of a lens of the processing unit 2 transported by the drone 23, has on the capturing quality. On the usage object 1 shown on the far left, this was captured using a wide-angle camera, whereas the usage object 1 shown in the middle was captured using a normal-angle camera, and the usage object 1 on the far right was captured with a telecamera. The wide-angle camera may allow a distance of 0 to 45 mm from the usage vehicle 2, the normal-angle camera may allow a distance of approximately 50 mm and a teleobjective may allow a distance from 55 mm.

The reason is that focal lengths of less than 50 mm and more than 50 mm may generate different distortion effects. As a result of the different use of focal lengths of for example 6 mm, visible distortions therefore appear on the captured images, so in order to have a comparison of all pictures in the end, no post-processing of the captured photographs should be carried out, so that the above-mentioned different objectives have to be applied.

The invention is not limited by the description or the embodiment examples, but rather covers every new feature as well as any combination of features, which also includes in particular any combination of the patent claims, even if this feature or this combination is not explicitly reflected in the patent claims or the embodiment examples.

List of reference numerals 1 usage object
2 processing unit
3 characteristic value
4 database object
5 physical detection process
11 identification means
21 screen
23 capturing element (drone)
30 images
40 controller
50 usage badge
60 marking elements
B1 region
B2 region
100 apparatus
1000 method

The invention claimed is:

1. A machine-implemented method for the physical detection of at least one usage object, the machine-implemented method comprising:
performing, by a processing unit of a smart phone or tablet:
subdividing or categorizing, by the processing unit of the smart phone or tablet, usage object data into individual object classes; and
classifying, by the processing unit of the smart phone or tablet, a usage object by comparing the individual object classes with at least one in a database of the processing unit and/or with a database of an external CPU, and the processing unit and/or the CPU and/or the user him/herself selects a database object corresponding to the characteristic value and displays the database object on a screen of the smart phone or tablet, so that a camera image of the usage object and the database object are shown on the screen at least partially optically superimposed and/or juxtaposed,
wherein the database object is an optical image of the usage object wherein the image of the usage object is displayed in a close approximation to a usage object correspondingly deposited in the database, on the basis of the characteristic value and/or an optical dimension of the usage object; wherein the usage object detected by the processing unit does not correspond in all dimensions and in terms of wear and tear of the usage object identified in the database in correspondence with the characteristic value, but a greatest match is produced on the basis of the predetermined minimum dimensions.

2. The machine-implemented method as claimed in claim 1, wherein a conversion unit is used to break down the usage object into individual object classes, which data classes are then individually or commonly compared with data or data classes correspondingly deposited in the database.

3. The machine-implemented method as claimed in claim 1, wherein the data object is a template image of the corresponding usage object, which is deposited in the database.

4. The machine-implemented method as claimed in claim 3, wherein once the characteristic value of the usage object has been determined, selecting on the basis of the characteristic value, the corresponding database object which can optically image the usage object, and displaying the optical image on a display next to the actually captured usage object.

5. The machine-implemented method as claimed in claim 4, wherein the usage object is detected in a user and/or an implementation device in such a way, that an image of the usage object detected by the detection process, is displayed at the same time as the database object shown on the display in an identical manner or in a manner identical to scale.

6. A non-transitory computer readable storage medium having instructions stored thereon, when the instructions are read and executed by a processing unit of a smart phone or tablet, the processing unit performs operations comprising:
    subdividing or categorizing, by the processing unit of the smart phone or tablet, usage object data into individual object classes; and
    classifying, by the processing unit of the smart phone or tablet, a usage object by comparing the individual object classes with at least one in a database of the processing unit and/or with a database of an external CPU, and the processing unit and/or the CPU and/or the user him/herself selects a database object corresponding to the characteristic value and displays the database object on a screen of the smart phone or tablet, so that a camera image of the usage object and the database object are shown on the screen at least partially optically superimposed and/or juxtaposed,
wherein the database object is an optical image of the usage object wherein the image of the usage object is displayed in a close approximation to a usage object correspondingly deposited in the database, on the basis of the characteristic value and/or an optical dimension of the usage object; wherein the usage object detected by the processing unit does not correspond in all dimensions and in terms of wear and tear of the usage object identified in the database in correspondence with the characteristic value, but a greatest match is produced on the basis of the predetermined minimum dimensions.

7. The non-transitory computer readable storage medium as claimed in claim 6, wherein a conversion unit is used to break down the usage object into individual object classes, which data classes are then individually or commonly compared with data or data classes correspondingly deposited in the database.

8. The non-transitory computer readable storage medium as claimed in claim 6, wherein the data object is a template image of the corresponding usage object, which is deposited in the database.

9. The non-transitory computer readable storage medium as claimed in claim 8, wherein once the characteristic value of the usage object has been determined, selecting on the basis of the characteristic value, the corresponding database object which can optically image the usage object, and displaying the optical image on a display next to the actually captured usage object.

10. The non-transitory computer readable storage medium as claimed in claim 9, wherein the usage object is detected in a user and/or an implementation device in such a way that an image of the usage object detected by the detection process, is displayed at the same time as the database object shown on the display in an identical manner or in a manner identical to scale.

\* \* \* \* \*